US011906925B2

(12) United States Patent
Huang et al.

(10) Patent No.: US 11,906,925 B2
(45) Date of Patent: Feb. 20, 2024

(54) CLEANER ROLLERS AND CLEANING ELECTROPHOTOGRAPHIC PHOTOCONDUCTORS

(71) Applicant: HEWLETT-PACKARD DEVELOPMENT COMPANY, L.P., Spring, TX (US)

(72) Inventors: Bin Huang, San Diego, CA (US); Minedys Macias Guzman, San Diego, CA (US); Daniel C. Tanchangco, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/913,381

(22) PCT Filed: Apr. 8, 2020

(86) PCT No.: PCT/US2020/027283

§ 371 (c)(1),
(2) Date: Sep. 21, 2022

(87) PCT Pub. No.: WO2021/206709

PCT Pub. Date: Oct. 14, 2021

(65) Prior Publication Data

US 2023/0147465 A1 May 11, 2023

(51) Int. Cl.
*G03G 21/00* (2006.01)

(52) U.S. Cl.
CPC ..... *G03G 21/0058* (2013.01); *G03G 21/0088* (2013.01)

(58) Field of Classification Search
CPC ........................ G03G 21/0058; G03G 21/0088
See application file for complete search history.

(56) References Cited

U.S. PATENT DOCUMENTS 4,974,030 A 11/1990 Tokunaga et al.
5,179,416 A 1/1993 Ku et al.
6,923,840 B2 8/2005 Schutz et al.
(Continued)

FOREIGN PATENT DOCUMENTS

EP 2056173 A1 5/2009
WO 2019/055029 A1 3/2019

OTHER PUBLICATIONS

"Polyols," retrieved at https://web.archive.org/web/20030124151902/https://poliuretanos.com.br/Ingles/Chapter1/14Polyethers.htm, retrieved on Dec. 1, 2020, pp. 3.

*Primary Examiner* — Walter L Lindsay, Jr.
*Assistant Examiner* — Andrew V Do
(74) *Attorney, Agent, or Firm* — Dierker & Kavanaugh, P.C.

(57) ABSTRACT

Herein is described a liquid electrophotographic a printing apparatus comprising: a photoconductor; a liquid electrophotographic ink developer unit for applying liquid electrophotographic ink to the photoconductor; a cleaner roller contactable with the photoconductor, the cleaner roller comprising an open-celled foam material having thereon a coating comprising abrasive particles and a binder. Also described herein is a cleaner roller for cleaning a liquid electrophotographic printing apparatus' photoconductor and a method of operating a liquid electrophotographic printing apparatus using a cleaner roller described herein.

17 Claims, 2 Drawing Sheets

(56) References Cited

U.S. PATENT DOCUMENTS

| | | | |
|---|---|---|---|
| 7,929,897 B2 | 4/2011 | Sugimoto et al. | |
| 9,261,812 B1 | 2/2016 | DiGirolamo et al. | |
| 2008/0101833 A1 | 5/2008 | Morishita | |
| 2009/0290909 A1 | 11/2009 | Nagami et al. | |
| 2011/0236052 A1 | 9/2011 | Takagi et al. | |
| 2016/0320738 A1 | 11/2016 | Tawada et al. | |
| 2020/0201236 A1* | 6/2020 | Cohen ................ | G03G 21/0005 |

* cited by examiner

CLEANER ROLLERS AND CLEANING ELECTROPHOTOGRAPHIC PHOTOCONDUCTORS

BACKGROUND

Electrostatic printing processes may involve creating an image on a photoconductive surface, applying an ink having charged particles to the photoconductive surface, such that they selectively bind to the image, and then transferring the charged particles in the form of the image to a print substrate.

The photoconductive surface can be on a cylinder and is often termed a photo imaging plate (PIP) or sometimes an inorganic photo-conductor (IPC). The substrate having the photoconductive surface will be termed a photoconductor herein for brevity. The photoconductive surface can be selectively charged with a latent electrostatic image having image and background areas with different potentials. For example, an electrostatic ink composition comprising charged toner particles in a carrier liquid can be brought into contact with the selectively charged photoconductive surface. The charged toner particles adhere to the image areas of the latent image while the background areas remain clean. The image is then transferred to a print substrate (e.g. paper) directly or, more commonly, by being first transferred to an intermediate transfer member, which can be a soft swelling blanket, and then to the print substrate. Variations of this method utilize different ways for forming the electrostatic latent image on a photoreceptor or on a dielectric material.

DETAILED DESCRIPTION

Figure 1:
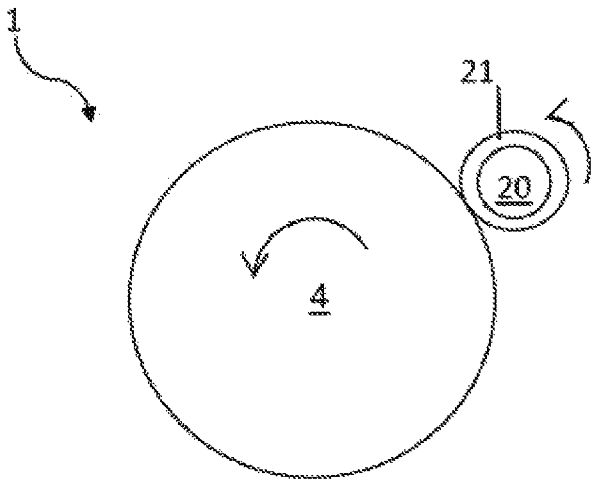
FIG. 1 shows a schematic cross-sectional view of an example of an electrophotographic printing apparatus.

Before the apparatus, methods and related aspects of the disclosure are disclosed and described, it is to be understood that this disclosure is not restricted to the particular apparatus, process features and materials disclosed herein because such apparatus and process features and materials may vary somewhat. It is also to be understood that the terminology used herein is used for the purpose of describing particular examples. The terms are not intended to be limiting because the scope is intended to be limited by the appended claims and equivalents thereof.

It is noted that, as used in this specification and the appended claims, the singular forms "a," "an," and "the" include plural referents unless the context clearly dictates otherwise.

As used herein, "liquid carrier", "carrier liquid", "carrier," or "carrier vehicle" refers to the fluid in which the polymer resin, pigment, charge directors and/or other additives can be dispersed to form a liquid electrostatic ink or electrophotographic ink. Liquid carriers can include a mixture of a variety of different agents, such as surfactants, co-solvents, viscosity modifiers, and/or other possible ingredients. The carrier liquid may be a nonpolar carrier liquid such as a hydrocarbon carrier liquid, for example, aliphatic hydrocarbons, isoparaffinic compounds, paraffinic compounds, dearomatized hydrocarbon compounds.

As used herein, "electrostatic ink composition" generally refers to an ink composition, which may be in liquid form, generally suitable for use in an electrostatic printing process, sometimes termed an electrophotographic printing process. The electrostatic ink composition may include chargeable particles of the resin and the pigment dispersed in a liquid carrier, which may be as described herein.

The "electrostatic ink compositions", "liquid electrostatic inks" or "liquid electrophotographic (LEP) inks" referred to herein may comprise a colorant and a thermoplastic resin dispersed in a carrier liquid. In some examples, the thermoplastic resin may comprise an ethylene acrylic acid resin, an ethylene methacrylic acid resin or combinations thereof. In some examples, the electrostatic ink also comprises a charge director and/or a charge adjuvant. In some examples, the liquid electrostatic inks described herein may be Electroink® and any other Liquid Electro Photographic (LEP) inks developed by Hewlett-Packard Company, If a standard test is mentioned herein, unless otherwise stated, the version of the test to be referred to is the most recent at the time of filing this patent application.

As used herein, "electrostatic(ally) printing" or "electrophotographic(ally) printing" generally refers to the process that provides an image that is transferred from a photo imaging substrate or plate (termed a photoconductor herein) either directly or indirectly via an intermediate transfer member to a print substrate, e.g. a paper substrate. As such, the image is not substantially absorbed into the photoconductor on which it is applied. Additionally, "electrophotographic printers" or "electrostatic printers" generally refer to those printers capable of performing electrophotographic printing or electrostatic printing, as described above. "Liquid electrophotographic printing" is a specific type of electrophotographic printing where a liquid ink is employed in the electrophotographic process rather than a powder toner. The liquid ink may a liquid carrier, e.g. a hydrocarbon liquid carrier, in which is dispersed chargeable particles comprising a resin and, in some examples, a pigment, e.g. a pigment selected from a magenta, cyan, yellow, black and white. An electrostatic printing process may involve subjecting the electrophotographic ink composition to an electric field, e.g. an electric field having a field strength of 1000 V/cm or more, in some examples 1000 V/mm or more.

As used herein, the term "electrophotographic printing apparatus" is used to refer to a printing apparatus that may be used to carry out electrophotographic printing, for example, liquid electrophotographic printing.

As used herein, the term "about" is used to provide flexibility to a numerical range endpoint by providing that a given value may be a little above or a little below the endpoint. The degree of flexibility of this term can be dictated by the particular variable.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Numerical data may be expressed or presented herein in a range format. It is to be understood that such a range format is used merely for convenience and brevity and thus should be interpreted flexibly to include not just the numerical values explicitly recited as the end points of the range, but also to include all the individual numerical values or subranges encompassed within that range as if each numerical value and sub-range is explicitly recited. As an illustration, a numerical range of "about 9 to about 40" should be interpreted to include not just the explicitly recited values of about 9 to about 40, but also include individual values and subranges within the indicated range. Thus, included in this numerical range are individual values such as 10, 10.5, and 11 and sub-ranges such as from 9-20, from 10-25, and from 10-30, etc. This same principle applies to ranges reciting a single numerical value. Furthermore, such an interpretation should apply regardless of the breadth of the range or the characteristics being described.

Unless otherwise stated, any feature described herein can be combined with any aspect or any other feature described herein.

Described herein in a first aspect is a liquid electrophotographic printing apparatus comprising:

- a photoconductor;
- a liquid electrophotographic ink developer unit for applying liquid electrophotographic ink to the photoconductor;
- a cleaner roller contactable with the photoconductor, the cleaner roller comprising an open-celled foam material having thereon a coating comprising abrasive particles and a binder.

Described herein in a second aspect is a cleaner roller for cleaning a liquid electrophotographic printing apparatus' photoconductor, the cleaner roller comprising an open-celled foam material having thereon a coating comprising abrasive particles and a binder, wherein the binder is formable from an isocyanate and a polyol.

Described herein in a third aspect is a method of operating a liquid electrophotographic printing apparatus, the method comprising:

- applying a liquid electrophotographic ink to a photoconductor having a latent electrostatic image thereon to form a developed image comprising the liquid electrophotographic ink;
- transferring the developed image, in reversed form, to an intermediate transfer member or a print medium in contact with the photoconductor;
- cleaning excess ink or components thereof from a photoconductor by contacting the photoconductor with a cleaner roller, the cleaner roller comprising an open-celled foam material having thereon a coating comprising abrasive particles and a binder.

In some electrophotographic printing processes, components of a liquid electrostatic ink composition may be deposited on an electrophotographic photoconductor, which may also be termed a printing drum, and may remain on the photoconductor after transfer of a developed image to a print substrate. In some examples, a cleaning fluid is used to clean an electrophotographic photoconductor, at least some of the cleaning fluid may remain on the surface of the electrophotographic photoconductor. In some examples, the cleaning fluid is selected from the same liquids as the carrier liquid described herein, for example the cleaning fluid may be the same as the carrier liquid. In some examples, the cleaning fluid is non-polar, e.g. a hydrocarbon cleaning fluid such as an isoparaffin. The cleaning fluid and/or components of a liquid electrostatic ink composition remaining on an electrophotographic photoconductor may be exposed to plasma during the charging process, for example during the formation of a latent electrophotographic image on an electrophotographic photoconductor. Exposure of the cleaning fluid and/or components of a liquid electrostatic ink composition on an electrophotographic photoconductor to plasma may lead to the oxidation of the cleaning fluid along with any other contaminants (e.g. components of the liquid electrostatic ink composition remaining on an electrophotographic photoconductor after transfer of a developed image to a print substrate) upon the surface of the electrophotographic photoconductor to form a residue. The residue formed on the electrophotographic photoconductor may be chemically attached to the surface of the electrophotographic photoconductor and can cause severe print quality problems. The strong chemical adhesion between residue and the electrophotographic printing surface makes this substance difficult to remove. Previous solutions to addressing this print quality problem have required stopping printing (i.e. taking the printing apparatus "offline") relatively frequently, for example either to replace the electrophotographic photoconductor or for etching/lapping of the photoconductor. The present inventors have found that by employing a cleaner roller as described herein, the number of print cycles which may be completed before it is necessary to take the printing apparatus offline is considerably increased.

Electrophotographic Photoconductor

An electrophotographic photoconductor (to be termed a photoconductor herein for brevity), which may be termed a printing drum or photo imaging plate, may be any substrate having a photoconductive surface suitable for use in an electrophotographic printing process, e.g. a liquid electrophotographic printing process.

In some examples, the photoconductor may be an electrophotographic printing drum comprising a metal layer (e.g. aluminium layer) disposed on a substrate (e.g. mylar substrate). A traditional photoconductor, sometimes termed a PIP, may comprise a charge generating layer disposed on the metal layer and a charge transfer layer disposed on the charge generating layer. In some examples, the charge generating layer and/or the charge transfer layer comprise a binder resin, for example a thermoplastic or thermosetting resin such as polymethylmethacrylate, polystyrene, vinyl polymers such as polyvinyl chloride, polycarbonates, polyesters, polysulfones, phenoxy resins, epoxy resins, silicone resins. In some examples, the charge generating layer and/or the charge transfer layer comprise a polycarbonate binder resin. In some examples, the drum is cylindrical, and charge transfer layer, for example charge transfer layer comprising a binder resin (such as a polycarbonate binder resin) may be disposed on an outer curved surface of the drum that connects two circular ends of the drum. In some examples, the charge transfer layer is disposed on the curved surface along part of, or all of, the length of the drum, the length of the drum being along the axis of the drum. In some examples, the charge transfer layer is disposed on the curved surface all or part way circumferentially around the drum. In some examples, the charge generating layer and a metal layer are disposed below the charge transfer layer and extend over the substrate of the drum to the same extent as the charge transfer layer.

In some examples, the electrophotographic PIP, or printing drum, may be an imaging drum comprising an inorganic photoconductive surface, such as an amorphous silicon photoconductor surface. Amorphous silicon is a non-crystalline allotrope of silicon. In some examples, the imaging drum comprises an electrically conductive substrate having a layer of amorphous silicon thereon, which, during printing, may act as an image receiving layer. The electrically conductive substrate may comprise or be a metal, e.g. chrome or aluminium, or electrically conductive compound, e.g.

indium tin oxide. In some examples, the inorganic photoconductive surface may comprise a material selected from amorphous selenium zinc oxide and cadmium sulfide. In some examples, the electrically conductive substrate may be disposed on an insulating layer. The insulating layer may comprise an electrically insulating material, which may be selected from glass, alumina or quartz. In some examples, the drum is cylindrical, and amorphous silicon may be disposed on an outer curved surface of the drum that connects two circular ends of the drum. In some examples, amorphous silicon is disposed on the curved surface along part of, or all of, the length of the drum, the length of the drum being along the axis of the drum. In some examples, amorphous silicon is disposed on the curved surface all or part way circumferentially around the drum.

Cleaner Roller

In the apparatus, a cleaner roller is contactable with the photoconductor, the cleaner roller comprising an open-celled foam material having thereon a coating comprising abrasive particles and a binder. The cleaner roller may be a cleaner roller for cleaning a liquid electrophotographic printing apparatus' photoconductor, the cleaner roller comprising an open-celled foam material having thereon a coating comprising abrasive particles and a binder, wherein the binder is formable from an isocyanate and a polyol.

The open-celled foam material may be or comprise a foamed polymer material, which may be termed a polymer foam. The polymer foam may be selected from a polyurethane foam, a polyester foam a polypropylene foam, a polyethylene foam, a polyurethane silicone foam, and a polyether polyurethane foam. In some examples, the foam of the cleaner roller is an open-celled polyurethane foam.

A polymer foam may be described as a polymeric material comprising pores (or cells). Pores in a polymer foam may be generated by gaseous displacement during polymerization to form the polymeric material comprising pores. A "pore" (or "cell") is a cavity in a material, the cavity at least partially bounded by walls of the material. In a material comprising interconnected pores such as the foam described herein, at least some of the walls bounding some of the pores do not fully enclose the pores (i.e. at least some of the walls bounding some of the pores do not fluidly isolate the pores) such that fluid can pass between pores.

The pores in a polymer foam are at least partially bounded by walls of the polymeric material. In order for the polymer foam of the cleaner roller to comprise interconnected pores, at least some of the polymer walls bounding some of the pores do not fluidly isolate the pores, i.e. such that fluid can pass between the pores (i.e. the polymer foam is an open-cell foam). In some examples, the foam may comprise a reticulated polymer foam. A "reticulated polymer foam" is highly porous foam due to the breaking down of the cells by (for example by forcing a pressurised gas through the cells of the polymer foam) such that the polymer foam comprises no closed cells (closed pores), i.e. all pores within a reticulated foam are fluidly connected.

The foam of the cleaner roller may be any suitable material for use with a cleaning fluid, for example for use with a hydrocarbon cleaning fluid, such as a paraffin, e.g. an isoparaffin. The open-celled foam material may be such that a cleaning fluid can be absorbed into and/or pass through the foam material.

Coating and Abrasive Particles

In some examples, the cleaner roller comprises an open-celled foam material having thereon a coating comprising abrasive particles and a binder.

The binder may have been formed from the polymerisation of an isocyanate. The isocyanate may be or comprise an aromatic or aliphatic isocyanate, optionally an aromatic isocyanate, optionally an aromatic isocyanate selected from diphenylmethane diisocyanate (MDI) and toluene diisocyanate (TDI). The isocyanate may be a polymeric aromatic or aliphatic isocyanate, e.g. a polymeric aromatic isocyanate based on diphenylmethane diisocyanate (MDI) and toluene diisocyanate (TDI).

In some examples, the binder has been formed from the polymerisation of the isocyanate with a polyol. In some examples, the binder has been formed from the polymerisation of the isocyanate in the presence of moisture and in absence of a polyol or other species that may react with the cyanate groups of the isocyanate.

The polyol may be selected from a polycarbonate polyol and a polyester polyol. The polyol may be a species with two or more free hydroxy groups, which may be three or more free hydroxy groups. The polyol may be selected from a polycarbonate diol and a polyester diol. The polyol may be a polycarbonate diol of the formula $HO—[—R^1—O—(C{=}O)—O—R^2—]_m—OH$, wherein R1 and R2 are each independently a group of the formula $—(CH_2)_n—$, wherein n is 3 to 8, optionally 4 to 6, optionally wherein n for $R^1$ is 5 and n for $R^2$ is 6 and m is 1 or more.

The molecular weight of the polyol, which may be determined by m, may be from 200-6000, optionally from 1000 to 4000, optionally from 2000 to 4000. This may be a number average molecular weight.

The abrasive particles may be any suitable abrasive material in particulate form. They may be pure or mixed (in terms of the types of material) and may be treated, e.g. surface-treated material. The abrasive particles may comprise or consist of a material selected from from alumina ($Al_2O_3$), BN, SiC, $ZrO_2$, $SiO_2$, $TiO_2$ and $CaCO_3$. The abrasive particles, which may be or comprise alumina, may have an aspect ratio of 2:1 to 10:1, optionally 3:1 to 7:1. The abrasive particles, which may be or comprise alumina, may have a mean particle size of 0.1 to 10 microns. The mean particle size may be the D50 size of the particles, measured volumetrically by laser diffraction, e.g. in a standard method, e.g. in ISO 13320:2020.

The wt:wt ratio of binder to abrasive particles may be from 20:80 to 80:20, optionally from 50:50 to 80:30, optionally from 60:40 to 70:40. The binder may be applied so that there is from 0.1 to 10 g of binder per m2 of foam roller surface, optionally from 0.5 to 10 g of binder per $m^2$ of foam roller surface, optionally 1 to 5 g of binder per $m^2$ of foam roller surface, which may be determined determined gravimetrically before and after ashing.

In some examples, the the isocyanate is an aromatic isocyanate, the polyol is polycarbonate diol and the abrasive particles comprise alumina has a mean particle size of 0.1 to 10 microns.

The coating may be applied by first mixing a formulation comprising the binder and the abrasive particles and applying this to the surface of the open-celled foam. The coating may be applied by first mixing a formulation comprising a precursor to the binder and the abrasive particles and applying this to the surface of the open-celled foam, and then converting the pre-cursor to the binder, e.g. by curing (e.g. by heat, electromagnetic radiation, e.g. UV radiation, or any other method that would result in curing). The precursor to the binder may comprise, for example the isocyanate as described herein and, if present, the polyol as described herein. The coating of the formulation to the open-celled foam may be applied by any method, including, but not limited to, spraying, dip coating and contact coating, e.g. application with an implement such as a brush, a knife or a roller. Further additives may be present in the formulation, e.g. a suitable catalyst to effect curing of the precursor to form the binder and/or any other additives, such as agents to make the formulation thixotropic and/or a wetting agent. A suitable solvent may be used, such as ethyl acetate or other appropriate solvent to dissolve and/or in which to suspend the components to form the binder. If forming a polyurethane, the catalyst may be any suitable catalyst, e.g. a tertiary amine such as an amine selected from triethylenediamine (TEDA, also called DABCO, 1,4-diazabicyclo[2.2.2]octane), dimethylcyclohexylamine (DMCHA), dimethylethanolamine (DMEA) and bis-(2-dimethylaminoethyl)ether, and lewis acids such as alkyl tin carboxylates, oxides and mercaptide oxides.

DESCRIPTION OF FIGURES

FIG. 1 shows a schematic illustration of an electrophotographic printing apparatus 1 comprising an electrophotographic printing drum 4 and a cleaner roller 20. The cleaner roller comprises an open-celled foam having thereon a coating 21 comprising abrasive particles and a binder. The coating on the open-celled foam of the cleaner roller 20 is contactable with the electrophotographic photoconductor (printing drum) 4. In some examples, the cleaner roller may comprises an inner core, for example a metal inner core, as a support (not shown in the Figure).

In some examples, the cleaner roller 20 is moveable from a cleaning position in which the coating on the foam of the cleaner roller engages with the surface of the PIP printing drum 4 and a disengaged position in which the cleaner roller 20 does not contact the printing drum 4. In some examples, the cleaner roller 20 is automatically moved to the cleaning position during printing and automatically moved to the disengaged position when printing stops.

In some examples, in the cleaning position the cleaner roller is positioned such that the axis of rotation of the cleaner roller is at least about 1 mm towards the axis of rotation of the printing drum past the point of first contact between the cleaner roller and the printing drum, in some examples at least about 2 mm, in some examples at least about 3 mm, and in some examples at least about 3.5 mm.

In some examples, the cleaner roller is motorised, for example motorised to have a constant rolling speed with respect to the surface of the printing drum during cleaning.

Figure 2:
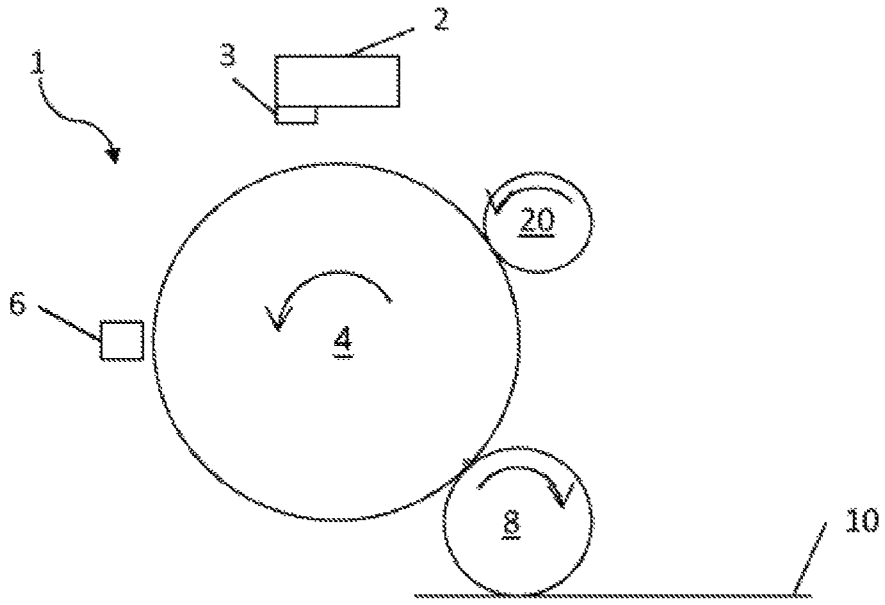
FIG. 2 shows a schematic cross-sectional view of an example of an electrophotographic printing apparatus.

FIG. 2 also shows a schematic illustration of an electrophotographic printing apparatus 1 comprising an electrophotographic printing drum 4 and a cleaner roller 20. Printing of an image using a liquid electrophotographic ink composition and cleaning of the printing drum 4 will now be described in relation to the printing apparatus 1 shown in FIG. 2.

An image, including any combination of graphics, text and images, may be communicated to the printing apparatus 1. In order to print an electrophotographic ink composition, firstly, the photo charging unit 2 deposits a uniform static charge on the electrophotographic printing drum 4 and then a laser imaging portion 3 of the photo charging unit 2 dissipates the static charges in selected portions of the image area on the electrophotographic printing drum 4 (in this examples the electrophotographic printing drum is an imaging drum comprising an amorphous silicon photoconductor surface) to leave a latent electrostatic image. The latent electrostatic image is an electrostatic charge pattern representing the image to be printed. The developer unit described here may be any suitable unit for applying the ink to a photoconductor and may apply the ink by, for example, a roller or a spray to the photoconductor. Typically, a single color is applied by a single developer unit and a unit for each color may be present in the apparatus (e.g. one for each of magenta, cyan, yellow and black, and possibly one or more further developer units for other colors such as white or transparent inks (inks lacking a pigment). A single developer unit for a particular color may be termed a binary ink developer. In some examples, the electrophotographic ink composition is then transferred to the electrophotographic printing drum 4 by a Binary Ink Developer (BID) unit 6. The BID unit 6 presents a uniform film of the electrophotographic ink composition to the electrophotographic printing drum 4. A resin component of the electrophotographic ink composition may be electrically charged by virtue of an appropriate potential applied to the electrophotographic ink composition in the BID unit. The charged resin component which, by virtue of an appropriate potential on the electrostatic image areas, is attracted to the latent electrostatic image on the electrophotographic printing drum 4 (first transfer). The electrophotographic ink composition does not adhere to the uncharged, non-image areas and forms an image on the surface of the latent electrostatic image. The electrophotographic printing drum 4 then has a developed electrophotographic ink composition image on its surface. Different colors may be applied to the photoconductive surface by different ink developer units.

The image may then transferred from the electrophotographic printing drum 4 to an intermediate transfer member (ITM) 8 by virtue of an appropriate potential applied between the electrophotographic printing drum 4 and the ITM 8, such that the charged electrophotographic ink composition is attracted to the ITM 8 (second transfer). The image may then be dried and fused on the ITM 8 before being transferred to a print substrate 10.

The printing apparatus 1 also includes a cleaner roller 20, the coating 21 on the open-celled foam of the cleaner roller being contactable with the electrophotographic printing drum 4.

The cleaner roller 20 may be contacted with the printing drum 4 to clean the surface of the printing drum 4. In some examples, during printing (e.g. the printing process described above), the cleaner roller 20 is moved into the cleaning position to clean the surface of the printing drum 4. In some examples, when printing stops, the cleaner roller 20 is moved to the disengaged position such that the cleaner roller 20 does not contact the printing drum 4.

Figure 3:
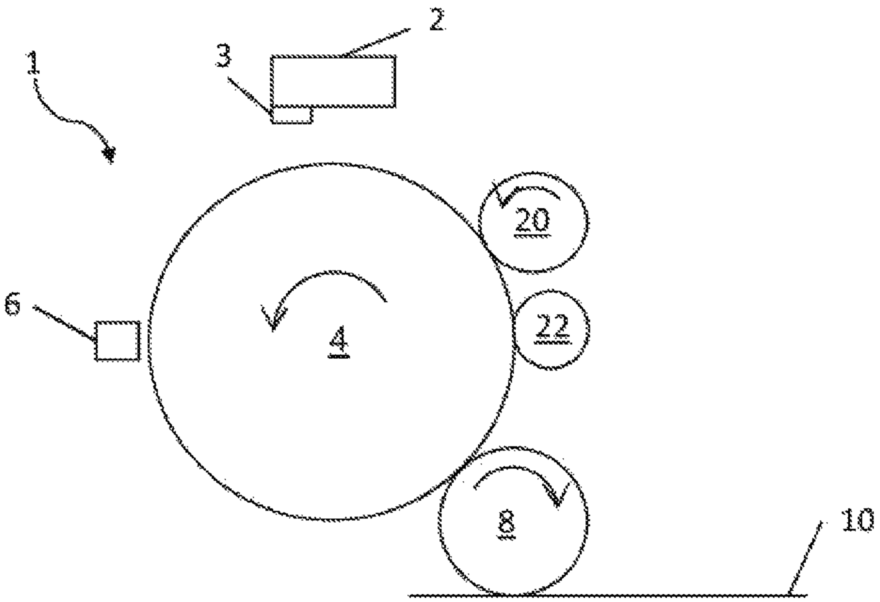
FIG. 3 shows a schematic cross-sectional view of an example of an electrophotographic printing apparatus.

FIG. 3 also shows a schematic illustration of an electrophotographic printing apparatus 1 comprising an electrophotographic printing drum 4 and a cleaner roller 20. Features described using like reference numerals in FIGS. 1 and 2 also apply to the apparatus shown in FIG. 3.

Printing apparatus 1 shown in FIG. 3 comprises a cleaning fluid dispensing roller 22 in addition to the cleaner roller 20. The cleaning fluid dispensing roller 22 supplies cleaning fluid to the surface of the electrophotographic printing drum before the surface to which the cleaning fluid has been applied reaches the cleaner roller 20. In some examples, cleaning fluid may be supplied directly to the cleaner roller 20. In some examples, the cleaning fluid dispensing roller 22 supplies a constant flow of cleaning fluid to the surface of the electrophotographic printing drum 4 when the cleaner roller is in the cleaning position. When the cleaner roller is in the cleaning position described above, the cleaning fluid dispensing roller 22 may also contact the surface of the electrophotographic drum 4 to supply cleaning fluid to the printing drum 4 before the surface is cleaned with cleaner roller 20. In some examples, the cleaning fluid dispensing roller 22 contacts the printing drum 4 when the cleaner roller 20 is in the cleaning position. In some examples, the cleaning fluid dispensing roller 22 may be spaced from the printing drum 4 when the cleaner roller 20 is in the disengaged position. In some examples, the cleaning fluid dispensing roller 22 is moveable with the cleaner roller 20. The cleaning fluid dispensing roller 22 may be formed of any material suitable for applying cleaning fluid to the surface of the electrophotographic printing drum 4. For example, the cleaning fluid dispensing roller 22 may comprise a foam formed from the same materials suitable for the cleaner roller 20. In some examples, the cleaning fluid dispensing roller 22 may be formed from a rubber material, for example the cleaning fluid dispensing roller 22 may be a rubber gravure roller. In some examples, cleaning fluid is supplied to the surface of a printing drum 4 at a rate in the range of about 4 l/min to about 15 l/min, for example the cleaning fluid dispensing roller 22 may supply cleaning fluid to the printing drum surface at a rate of about 4 l/min to about 15 l/min.

Figure 4:
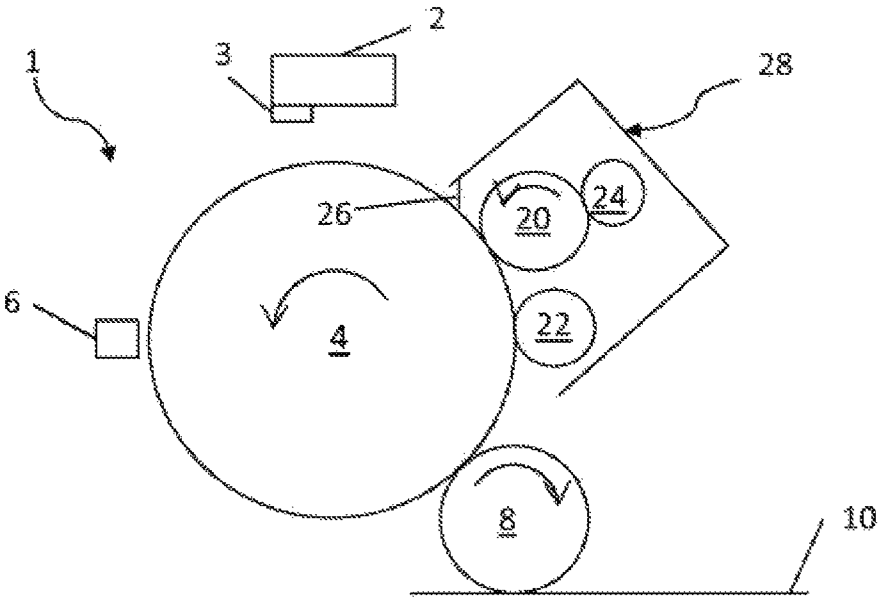
FIG. 4 shows a schematic cross-sectional view of an example of an electrophotographic printing apparatus.

FIG. 4 also shows a schematic illustration of an electrophotographic printing apparatus 1 comprising an electrophotographic printing drum 4 and a cleaner roller 20. Features described using like reference numerals in FIGS. 1 to 3 also apply to the apparatus shown in FIG. 4.

Printing apparatus 1 shown in FIG. 4 comprising a cleaning station 28 comprising the cleaner roller 20 along with a squeegee roller 24, cleaning fluid dispensing roller 22 and resilient blade 26. The resilient blade 26 is also contactable with the printing drum 4. In some examples, the resilient blade 26 contacts the printing drum 4 when the cleaner roller 20 is in the cleaning position. In some examples, the resilient blade 26 may be spaced from the printing drum 4 when the cleaner roller 20 is in the disengaged position. In some examples, the resilient blade 26 is moveable with the cleaner roller 20.

The resilient blade may be formed of a material such as a polymer, for example polyurethane. The resilient blade 26 may be employed to remove dirty cleaning fluid from the surface of the printing drum 4. The squeegee roller 24 may be contactable with the cleaner roller 20, for example to remove cleaning fluid and dirt from the cleaner roller 20. The squeegee roller 24 may be formed of a material harder than the foam of the cleaner roller 20, for example the squeegee roller 24 may be formed of a metal material.

EXAMPLES

An open-celled polyurethane roller was coated with a coating comprising abrasive particles and a binder, as described below. Two coating formulations (A and B) were tested, as shown below in Table 1.

TABLE 1

| Formulas | Note | A | B |
|---|---|---|---|
| BYK D140 | Additive | 0.8 | 0.8 |
| ethyl acetate | Solvent | 80 | 80 |
| BYK 180 | Additive | 1.6 | 1.6 |
| PH300D | Polyol | 12 | 0 |
| WCA1 | alumina (2 um) | 40 | 40 |
| MR light | Isocyanate | 12 | 24 |
| 33LV | Catalyst | 0.2 | 0.2 |

BYK-D D410 is available from BYK Additives and Instruments and is a liquid rheology additive comprising a modified urea. It generates highly thixotropic flow behaviour.

BYK 180 is DISPERBYK-180, available from BYK Additives and Instruments, and is a wetting and dispersing additive; it comprises alkylol ammonium salt of a copolymer with acidic groups PH300D is a polycarbonate diol with the trade name Eternacoll PH-300, available from UBE Industries, Ltd. of the formula HO—[—R1-O—(C═O)—O—R2-]—OH, wherein R1 and R2 are each independently a group of the formula —(CH2)n-, wherein n for R1 is 5 and n for R2 is 6. It has an average molecular weight of about 3000 Daltons. An OH value (KOH mg/g) of about 37 (+/−3).

WCA1 is an alumina, Microgrit WCA1, available from Microabrasives Corporation, with a mean particle size of about 1-2 microns. It has an aspect ratio of about 5:1. It has a Mohs hardness of about 9. The particles are disc-like in shape.

MR Light is Mondur MR-Light, available from Covestro, which is an aromatic polymeric isocyanate based on diphenylmethane-diisocyanate (MDI).

33LV is Dabco 330-LV, available from Sigma-Aldrich.

Coating Procedure

Coating Formulation

The coating solution was prepared according to the formulation example table and mixed on stirring plate, with the catalyst added last.

Foam Roller to be Coated

This was a metal roller fitted with open cell polyurethane foam (GTK). It had an outer diameter of 38 mm and a foam thickness 10 mm. The foam roller to be coated was installed vertically in a coating booth: two ends of the roller journal held by fixture. It spun during coating.

Spray Coating Device

This was a pneumatic HVLP spray gun (Devilbiss FLG4) with a nozzle size of 1.3 mm.

Spray Coating Process

The coating solution was added to a coating cup and installed onto the spray gun.

The foam roller rotates at 250 rpm.

The spray gun operates at a pressure of 20 PSI, and flowrate is set at ~14 g/min and nozzle held at a distance of 10 cm from the roller surface.

A mist of coating solution came out of the gun nozzle creating a spray pattern covering a section of the roller surface facing the spray gun As the roller rotates at high speed, the spray gun was translated vertically with a velocity of 4 cm/s along the roller axis (from one end to the other end) for 3-4 cycles. This repeated coating process uniformly coated the roller surface with the formulation containing particles and unreacted binder. Most of the solvent evaporates during spray coating.

The coating weight is 2-3 g alumina per m2 foam roller surface, determined gravimetrically by ashing.

On a single roller, one end was treated with formula B, the other end was treated with formula A, and a middle section between both ends was left untreated.

Post-Coating

The coated foam was brought to 100° C. oven for 2 hours curing to allow the binder components to react and polymerize. The roller was then allow to cool to room temperature before use.

Testing Conditions—(a): Cleaning a Dirty IPC (Inorganic Photo-Conductor) Drum after Printing A heavily contaminated IPC drum (diameter 170 mm) after extensive printing was kept stationary.

The foam roller, treated with three distinct surfaces was tested (as described above, i.e. formulation B at one end (end A), control (no coating) in the middle, formulation B at the other end (end B)

The foam roller was rotating at 300 rpm on IPC surface

The IPC drum (diameter 170 mm) was rotated at 240 rpm (opposite direction to the foam roller)

Cleaning is limited to nip area between IPC and rotating roller

Lubrication is provided with cleaning solvent (isopar L)

Results (a)

The contaminant was removed from the IPC drum surface on the areas exposed to both coating formulas after 10 min of cleaning. The IPC surface exposed to the uncoated foam (control surface) still was found to have the contaminant (residue).

The particle-coated foam roller did not damage the IPC surface.

Testing Conditions—(b): Keeping an IPC Drum Clean During Continuous Printing

The foam roller, treated with three distinct surfaces was tested (as described above, i.e. formulation B at one end (end A), control (no coating) in middle, formulation B at the other end (end B)

IPC drum (diameter 170 mm) rotating at 240 rpm

Particle-coated foam roller rotating at 300 rpm (opposite to IPC rotation)

The whole IPC drum circumference is cleaned with the length of the cleaner roller (with different parts of the IPC in contact with the different surfaces of the foam roller).

Lubrication is provided with cleaning solvent (isopar L)

Results (b)

The IPC surface exposed to both coating formulas A and B was kept clean, during continuous printing, up to 55 k impressions.

The IPC area exposed to the uncoated foam (in the middle of the cleaner roller) exhibited contaminant after continuous printing to 55 k impressions.

The particle-coated foam roller did not damage the IPC surface, as exhibited by the mirror-like reflection. Formulation A was found to be more effective than formulation B, and resulted in fewer scratches on the IPC surface.

In some examples, the binder has been formed from the polymerisation of the isocyanate with a polyol.

While the printing apparatus, methods and related aspects have been described with reference to certain examples, it will be appreciated that various modifications, changes, omissions, and substitutions can be made without departing from the spirit of the disclosure. It is intended, therefore, that the printing apparatus, methods and related aspects be limited only by the scope of the following claims. The features of any dependent claim can be combined with the features of any of the other dependent claims, and any other independent claim.

The invention claimed is:

1. A liquid electrophotographic printing apparatus, comprising:

a photoconductor;

a liquid electrophotographic ink developer unit for applying liquid electrophotographic ink to the photoconductor; and a cleaner roller contactable with the photoconductor, wherein the cleaner roller comprises an open-celled foam material and a coating on the open-celled foam material, the coating comprising abrasive particles and a binder formed from polymerization of an isocyanate.

2. The liquid electrophotographic printing apparatus according to claim 1, wherein the isocyanate is or comprises an aromatic or aliphatic isocyanate.

3. The liquid electrophotographic printing apparatus according to claim 2, wherein the binder is formed from the polymerization of the isocyanate with a polyol.

4. The liquid electrophotographic printing apparatus according to claim 3, wherein the polyol is selected from the group consisting of a polycarbonate polyol and a polyester polyol.

5. The liquid electrophotographic printing apparatus according to claim 3, wherein the polyol is a polycarbonate diol of the formula $HO—[—R^1—O—(C{=}O)—O—R^2—]_m—OH$, wherein $R^1$ and $R^2$ are each independently a group of the formula $—(CH_2)_n—$, and wherein n is 3 to 8 and m is 1 or more.

6. The liquid electrophotographic printing apparatus according to claim 5, wherein the polyol has a number average molecular weight of from 200 to 6000.

7. The liquid electrophotographic printing apparatus according to claim 1, wherein the abrasive particles are selected from the group consisting of alumina ($Al_2O_3$) particles, BN particles, SiC particles, $ZrO_2$ particles, $SiO_2$ particles, $TiO_2$ particles, and $CaCO_3$ particles.

8. The liquid electrophotographic printing apparatus according to claim 7, wherein the abrasive particles are alumina ($Al_3O_3$) particles and wherein the alumina ($Al_3O_3$) particles have an aspect ratio of from 2:1 to 10:1.

9. The liquid electrophotographic printing apparatus according to claim 7, wherein the abrasive particles are alumina ($Al_3O_3$) particles and wherein the alumina ($Al_3O_3$) particles have a mean particle size of from 0.1 microns to 10 microns.

10. The liquid electrophotographic printing apparatus according to claim 1, wherein a wt:wt ratio of the binder to the abrasive particles is from 20:80 to 80:20.

11. The liquid electrophotographic printing apparatus according to claim 1, wherein the open-celled foam material is selected from the group consisting of a polyurethane foam, a polyester foam, a polypropylene foam, a polyethylene foam, a polyurethane silicone foam, and a polyether polyurethane foam.

12. The liquid electrophotographic printing apparatus according to claim 1, wherein the binder is formed from the polymerization of the isocyanate in the absence of a polyol.

13. The liquid electrophotographic printing apparatus according to claim 1, wherein the coating further comprises an additive selected from the group consisting of a solvent, a wetting agent, a catalyst, and combinations thereof.

14. A cleaner roller for cleaning a photoconductor of a liquid electrophotographic printing, the cleaner roller comprising an open-celled foam material and a coating on the open-celled foam material, the coating comprising abrasive particles and a binder formed from polymerization of an isocyanate and a polyol.

15. The cleaner roller according to claim 14, wherein the isocyanate is an aromatic isocyanate, the polyol is polycarbonate polyol, and the abrasive particles comprise alumina particles having a mean particle size of from 0.1 microns to 10 microns.

16. A method of operating a liquid electrophotographic printing apparatus, the method comprising:

applying a liquid electrophotographic ink to a photoconductor having a latent electrostatic image thereon to form a developed image comprising the liquid electrophotographic ink;

transferring the developed image, in reversed form, to an intermediate transfer member or a print medium in contact with the photoconductor; and cleaning excess electrophotographic ink or components of the electrophotographic ink from the photoconductor by contacting the photoconductor with a cleaner roller, wherein the cleaner roller comprises an open-celled foam material and a coating on the open-celled foam material, the coating comprising abrasive particles and a binder formed from polymerization of an isocyanate.

17. The method according to claim 16, wherein a cleaner fluid is applied to the photoconductor from the cleaner roller or another roller.

* * * * *